United States Patent Office 2,959,474
Patented Nov. 8, 1960

2,959,474
ABRASIVE BOND

Rupert S. Daniels, Union, and Anthony J. Mostello, Newark, N.J., assignors to Union Carbide Corporation, a corporation of New York No Drawing. Filed Jan. 27, 1956, Ser. No. 561,935

27 Claims. (Cl. 51—298)

This invention relates to synthetic res'ns particularly suitable for preparing resin-bonded abrasive articles. More especially, it relates to the preparation of heat-hardenable resinous compositions comprising phenol-aldehyde resins in admixture with water-insoluble resinous polyvinyl alkyl ethers. The present invention also relates to the resulting novel resins and abrasive articles made therefrom.

Abrasive articles bonded with a phenol-aldehyde resin are well known in the art. Such articles are used for a variety of purposes, such as snagging steel castings, grinding steel billets to prepare them for rolling, and for cutting steel. Such wheels have a high cutting rate and grinding efficiency, i.e. the ratio of material removed is high relative to wheel loss. However, the surface developed on the ground object is not as smooth as that normally produced by a shellac or rubber bonded wheel. This has been explained on the basis that in such wheels the bond is softened under the heat of gr'nding and the wheel "hugs" the work and produces a sort of buffing or polishing action along with the grinding action.

It has been suggested, therefore, that thermoplastic resins be incorporated with phenol-formaldehyde resins to impart to them the desirable properties achieved with shellac and vulcan'zed rubber bonds. A variety of thermoplastic materials has been suggested for this purpose, including, for example, polyvinyl acetate, polyvinyl chloride, and the co-polymers of vinyl acetate and chloride, the co-polymers of vinylidene chloride and vinyl chloride, and the partial acetals of polyvinyl alcohol and polystyrene.

Various methods have been suggested for incorporating such thermoplastic materials in the abrasive bond. In one method, the abrasive grains are mixed with an excess of solvent normally used in making an ordinary resin bonded article and then the heat-hardenable phenol-formaldehyde resin added and the mixing is cont nued until a very sticky composition is obtained. This composition is then mixed with the thermoplastic resin and then add tional heat-hardenable resin is added and the mixing is continued until a dry mix suitable for pressing into abrasive wheels is obtained. Such a method is time consuming and the thermoplastic resin is not too intimately mixed with the heat-hardenable resin. As a consequence, abrasive wheels prepared in this manner do not have strength characteristics as good as abrasive wheels prepared from heat-hardenable bonds alone.

An object of this invention is to prepare by conventional methods heat-hardenable phenol-aldehyde res nous compositions in admixture with thermoplastic resins the resulting compositions being suitable for use in preparing abrasive articles.

Another object is to prov'de abrasive articles superior in their strength characteristics to abrasive articles in which a phenol-formaldehyde heat-hardenable resin alone is the bonding agent.

A further object is to provide abrasive articles which comprise heat-hardenable phenol-aldehyde resins in admixture with thermoplastic resins such that said articles are well adapted to the snagging of steel castings and the grinding of steel billets, give finishes comparable to those obtained with rubber- or shellac-bonded wheels and which are superior to such wheels in their grinding efficiencies.

The foregoing and other objects have been attained in accordance with this invention wherein a small amount of a polyvinyl alkyl ether resin having a reduced viscosity as set forth hereinafter is intimately adm'xed with a heat-hardenable phenol-aldehyde acid-catalyzed resin to form a heat-hardenable synthetic resin binder suitable for the preparation of resin-bonded abrasive articles.

The phenol-formaldehyde resins which are useful in accordance with the present invention are the so-called novolak type in which the phenol is reacted in an amount in molar excess over the formaldehyde, in the presence of an acid catalyst. By "molar excess" is simply meant that the moles or parts of moles of phenol employed are greater than the moles or parts of moles of formaldehyde as $CH_2O$. We have found that when the molar ratio of phenol to formaldehyde is about 1.1 to 1.0, respectively, excellent results are obtained.

The formaldehyde may be used in any obtainable form, e.g., as the solid paraformaldehyde or in the form of a 37.5% aqueous solution.

Any conventional acid-catalyst used in the preparation of 2-step phenol-aldehyde resins may be employed. Oxalic acid is an example of such a catalyst.

The brittle, fusible phenol-aldehyde resins used herein can be converted under heat to an infusible, sol d state, in the presence of a heat-hardening agent for 2-step phenol-aldehyde resins. Such an agent useful herein is hexamethylene tetramine, 10% by weight of the latter, based on the weight of the aforesaid fusible resins, being the usual amount employed.

The polyvinyl alkyl ethers which we have found useful herein are water-insoluble, soft, tacky, rubbery, clear water-white to straw colored materials obtained by the polymerization of the vinyl alkyl ethers of the general type:

$$CH_2=CHOR$$

where R is an alkyl radical such as ethyl, propyl or n-butyl.

Polymerization of the vinyl alkyl ethers proceeds readily in the presence of an acid type polymerization catalyst and is usually conducted at temperatures from room temperature to about 100° C. in the presence of an inert solvent. Depending on the temperatures and on the catalyst employed, polymers are obtained which vary from viscous liquids to viscous, stick honey-like masses or soft rubbery, tacky materials. For the purposes of this invention only those solid polymers are su table which have a reduced viscosity of more than three and preferably about 3.5 and 6.5, the upper limit advantageously being about 4.5.

By "reduced viscosity" we mean herein the specific viscosity of 0.5000 gram of polymer in 100 ml. of benzene d'vided by the concentration in grams per 100 ml. of solvent, and thus numerically equal to twice the specific viscosity. The specific viscosity is the (viscosity of solution/viscosity of solvent) — 1.

The two types of resins compris'ng our novel resinous compositions are combined in the proportions of about ¼ to one part of polyvinyl alkyl ether to about seven parts of phenol-formaldehyde resin. Preferably, about 0.35 to 0.7 part of the polyvinyl ether is employed. With larger amounts, the resins become difficult to pulverize to the degree of fineness required for use in abrasive compositions. Smaller amounts of polyvinyl alkyl ether are not particularly effective.

The two resins can be combined by simply milling them together on differential rolls. After a uniform homogeneous composition sheet is obtained, the necessary amount of hexamethylene tetramine, or other heat-hardening agent for phenol-aldehyde acid-catalyzed resins, is added to render the composition potentially reactive, the agent being incorporated by further milling. The cooled, milled sheet is granulated and then pulverized to a fineness of 98% through 200 mesh.

An improved method of combining the two resins and one producing a more homogeneous composition with greater bonding strength is to dissolve the polyvinyl alkyl ether in the phenol and react the phenol-ether solution with paraform, about 1.1 mole of phenol to 1.0 mole of paraform, in the presence of an acid catalyst. Paraform rather than formalin is used in this method since aqueous solutions of formaldehyde, such as formalin, precipitate the vinyl ether out of the phenol solution. In some cases, particularly in the case of longer chain alkyl vinyl ethers e.g. butyl vinyl ether, it may be desirable to employ a small amount (up to about 20% of the weight of phenol) of a solvent such as toluene or xylene to facilitate solution of the vinyl ether. Instead of paraformaldehyde, it is feasible to substitute trioxymethylene. The resin thus obtained is a fusible, clear, homogeneous, grindable resin which when mixed with hexamethylene tetramine in an amount equal to about 10% by weight of the phenol-aldehyde resin, can be converted on heating to the infusible, insoluble state.

To fabricate an abrasive wheel using the resins of this invention, the procedure can be as follows.

The abrasive grains, either fused aluminous oxide grain, silicon carbide, corundum or the like are mixed with furfural or with a liquid formaldehyde resin. A typical liquid formaldehyde resin is one prepared from equal molar quantities of phenol and paraform and reacted with an alkaline catalyst, such as sodium hydroxide, to a viscosity of approximately 350–400 cps. After thorough mixing, the furfural or resin wetted grains are mixed with the pulverized mixture of hexamethylene tetramine and the phenol-formaldehyde-polyvinyl alkyl ether resins of this invention. The abrasive mixture is then cold molded under a pressure of 1000–10,000 p.s.i. and then baked according to the following representative schedule:

Temperature: 80° F. to 175° F. for 20 min., then 175° F. to 195° F. for 2 hrs.; then at 195° F. for 12 hrs., then 195° F. to 215° F. for 2 hrs.; then at 215° F. for 3 hrs., then 215° F. to 245° F. for 3 hrs.; then at 245° F. for 3 hrs., then 245° F. to 285° F. for 4 hrs.; then at 285° F. for 2 hrs., then 285° F. to 365° F. for 8 hrs.; and finally, at 365° F. for 9 hrs.

Instead of the "cold press" method being employed, the abrasive mixture may be pressed hot at temperatures of 300° F. by known procedures.

To test the strength characteristics of abrasive mixes containing resins having varying proportions of polyvinyl alkyl ethers and phenol-formaldehyde resins, duplicate standard resin bonded abrasive test bars were prepared. When so tested, it was surprisingly found that abrasive articles could be prepared which had greatly superior tensile and flexural strengths at operating temperatures when compared to abrasive articles bonded with a standard phenol-formaldehyde resin. Those resin compositions comprising about one part by weight of polyvinyl alkyl ether to nine parts by weight of phenol-formaldehyde resins were particularly suitable and abrasive wheels bonded with such resins were more than 70% stronger than standard phenol-formaldehyde resin bonded wheels. Moreover, wheels produced using resins of this invention had a high cutting rate and good efficiency and gave a finish comparable to that obtainable with rubber bonded wheels of the same grit composition.

The fabrication of such wheels can be accomplished by standard procedures and requires no additional mold equipment.

While the resins of this invention have proven particularly useful as abrasive wheel bonds, they are also adaptable as bonds for abrasive papers, friction elements such as brake linings, brake shoes, and the like.

The following examples are illustrative of the invention. Examples I, II, III, and IV, illustrate procedures for preparing the phenol-formaldehyde polyvinyl ether resin used in the abrasive compositions of Examples V, VI, VII and VIII. Parts are parts by weight.

EXAMPLE I (a) A mixture of 100 parts of phenol and 72 parts of formaldehyde (37%) were heated to 55° C. and sufficient oxalic acid was added to give a pH of 1.05–1.15. The mixture was reacted under vacuum reflux at 80° C. until the mixture became cloudy. The temperature was then increased to 120° C. and the reaction was continued under a pressure of about 15 pounds per square inch for about two hours. The reaction mixture was then dehydrated at atmospheric pressure to a residue temperature of 160° C. and then under reduced pressure until a sample of the resin had a melting point of about 105° C.

(b) One hundred parts of coarsely ground (about 6–10 mesh) phenol-formaldehyde resin from (a) was mixed with 10.8 parts of polyvinyl ethyl ether having a reduced viscosity as aforesaid of 4.0, and milled on unheated differential rolls for about four minutes or until a uniform sheet was formed. Then 8.0 parts of hexamethylene tetramine were added and the sheet was milled another two minutes after which it was stripped from the rolls, cooled to 25° C., and granulated to 6–10 mesh, then ground to a mesh of 90% passing through 200 mesh screen. A sample of this mixture gelled and became infusible when heated for 129 seconds at 150° C.

EXAMPLE II (a) A mixture of 2,000 parts of phenol and 25 parts of oxalic acid ($C_2O_4H_2 \cdot 2H_2O$) was heated to 102–103° C. and 200 parts of polyvinyl ethyl ether having a reduced viscosity as aforesaid of 4.0, was added and the mixture was heated to 145–150° C. to effect solution. The mixture was cooled to 105° C. and 525 parts of paraformaldehyde was added in 75 parts portions during a two hour period, the temperature being maintained between 105–115° C. At the end of the reaction period, the resin was dehydrated under reduced pressure (20″ Hg) to a residue temperature of about 155–160° C. The resulting resinous reaction product was discharged from the reaction flask into shallow pans and allowed to cool to room temperature. A sample had a melting point of about 106–108° C.

(b) Eight hundred parts of the resinous product from (a) was granulated and mixed with 64 parts of hexamethylene tetramine and the mixture was pulverized to a mesh of 90% passing through a 200 mesh screen. A sample of this mixture, when heated at 150° C., gelled and became infusible in 67 seconds.

EXAMPLE III (a) A mixture of 2000 parts of phenol and 50 parts of polyvinyl ethyl ether having a reduced viscosity of about 4.0 was heated to 160° C. until solution was effected. The solution was cooled to 105° C. and 20 parts of oxalic acid were added. The mixture was reacted at 105° C.–110° C. with 525 parts of paraformaldehyde added portion-wise as described in Example II(a). At the end of the two hour reaction period, the resin was dehydrated under reduced pressure (20″ Hg) to a residue temperature of about 155–160° C. The dehydrated reaction product had a melting point of 114–115° C. It was granulated and mixed with 10% by weight of its weight of hexamethylene tetramine, then pulverized as described in Example II(b). A sample of this resin gelled and became infusible when heated for 85 seconds at 150° C.

(b) A resinous product was prepared using the procedure described in (a) of this example but using 100 parts of the polyvinyl ether employed in (a). The dehydrated reaction product had a melting point of 116–117° C. It was granulated and mixed with 10% by weight of hexamethylene tetramine, then pulverized as described in Example II(b). A sample of this resin gelled in 95 seconds when heated at 150° C.

EXAMPLE IV

Forty parts of polyvinyl n-butyl ether having a reduced viscosity of 6.0 was fluxed on cold rolls and then 400 parts of phenol-formaldehyde resin prepared as described in Example I(a) was added and the whole was milled to a uniform homogeneous sheet. 35.2 parts of hexamethylene tetramine was sprinkled on the sheet and milling was continued for 1½ minutes to effect blending in of the hexamethylene tetramine. The sheet was then stripped from the rolls and was allowed to cool.

The resulting product was a brittle, grindable sheet which was first coarsely ground, then pulverized to a powder, 90% passing through a 200 mesh sieve. A sample of this resin gelled in 129 seconds when heated at 150° C.

EXAMPLE V (a) 830 parts of a mixture of equal parts of No. 12, No. 14 and No. 16 aluminum oxide abrasive grain was coated with 30 parts of a liquid phenol-formaldehyde resin having a viscosity of about 360 cps. at 25° C. This resin was prepared by reacting 160 parts of phenol and 50 parts of paraformaldehyde together in the presence of sodium hydroxide catalyst to a viscosity of about 360 cps. The resulting mixture was then tumbled with a blend of 60 parts of cryolite and 80 parts of the resin from Example I(b).

(b) Figure eight tensile test specimens approximately 1″ thick were cold molded using 200 grams of the abrasive mixture (a) to give a test specimen having a pressed density of 2.90 grams/cc.

(c) Flexural bar test specimens 6″ x 1″ x ½″ were cold molded using 142½ grams of the abrasive mixture from (a) to give test specimens having a pressed density of 2.90/cc. (47.5 grams per cubic inch).

(d) A similar set of tensile and flexural test specimens were prepared but using the phenol-formaldehyde resin described in Example I (a) mixed with the required amount of hexamethylene tetramine (about 10 parts for 100 parts resin) to convert it when heated to the infusible insoluble state.

The test specimens from (b), (c) and (d) were baked on the previously given graduated schedule for 48 hours, the final temperature of baking being 365° F. After cooling they were tested, and as shown in Table I, the test specimens described in (b) had an average value of tensile strength of 2600 p.s.i., whereas the bars prepared as described in (d) had an average value tensile strength of 1520 p.s.i. The improvement in tensile strength, therefore, of the test specimens bonded with the polyvinyl ether modified resin was approximately 71%. The improvement in flexural strength at room temperature was about 47%.

EXAMPLE VI

Using the procedure described in Example V (a), (b), (c) test specimens were prepared from a mixture of abrasive grains and the polyvinyl ethyl ether phenol-formaldehyde resin described in Example II (b). The average tensile strength of the test bars was 2520 p.s.i. or about the same improvement was obtained as when using the resin described in Example I (b). However, the improvement in flexural strength at room temperature was about 70%.

EXAMPLE VII

Using the procedure described in Example V (a), (b), (c) test specimens were prepared from a mixture of abrasive grains and the polyvinyl ether phenol-formaldehyde resins described in Example III (a) and Example III (b) and Example IV. The average tensile strengths and flexural strengths for these specimens as compared to those of Examples IV and V and a standard test specimen are shown in Table I.

Table I

| Resin | Percent by Weight Polyvinyl Ether | Tensile Strength, p.s.i. | Flexural Strength, p.s.i. at 25° C. |
|---|---|---|---|
| Ex. III (a) | 2.5 | 1,543 | 3,370 |
| Ex. III (b) | 5.0 | 1,760 | 4,690 |
| Ex. I (b) | 10.0 | 2,600 | 5,490 |
| Ex. II (b) | 10.0 | 2,520 | 6,250 |
| Ex. IV | 10.0 | 2,000 | 4,617 |
| Standard | 0.0 | 1,520 | 3,740 |

It will be noted from Table I, in which the test specimens are illustrative of a dense, coarse grain structure such as used for snagging wheels, that a resin containing about 2.5% polyvinyl ether does not give an appreciably better abrasive bond than a standard resin, while the resins containing about 5 to 10% have appreciably better tensile strengths and better flexural strengths at 25° C. At 10% the flexural strengths at 200° C. are somewhat lower than for standard, but they have adequate strength for normal grinding operations.

EXAMPLE VIII 1225 parts of No. 54 aluminum oxide abrasive grain was coated with 28 parts of the liquid phenol-formaldehyde resin having a viscosity of about 360 centipoises at 25° C. employed in Example V (a). This mixture was then tumbled with 147 parts of the powdered resin from Example IV. The resulting abrasive-resin mix was pressed into flexural strength test bars 6″ x 1″ x ½″, 130 grams of abrasive resin mix to each bar. The pressed density was 43⅓ grams per cubic inch. The test specimens were baked on the previously given graduated schedule and tested after cooling, the results being given in Table II. For comparison the flexural strengths for a similar set of test specimens using the phenol-formaldehyde resin and the required amount of hexamethylene tetramine described in Example I (a) are also given:

Table II

| Resin | Percent by Weight Polyvinyl Ether | Flexural Strength, p.s.i. | |
|---|---|---|---|
| | | at 25° C. | at 200° C. |
| Ex. VIII | 10.0 | 6,490 | 5,950 |
| Standard | 0.0 | 5,780 | 4,930 |

It will be noted from Table II, in which the test specimens are illustrative of an open medium grain structure such as used for cutting wheels, that the flexural strengths of the polyvinyl ether modified resin bond are superior to the standard bond at both 25° C. and 200° C.

While we have described our invention in detail in its preferred embodiment, it will be obvious to those skilled in the art, after understanding our invention, that various changes and modifications may be made therein without departing from the spirit or scope thereof. We aim in the appended claims to cover all such modifications and changes.

We claim:

1. A synthetic resin suitable for the preparation of resin-bonded abrasive articles, comprising a phenol-aldehyde, acid-catalyzed, fusible, grindable resin wherein the phenol component is present in molar excess over the aldehyde component, and, in intimate admixture with said resin, a water-insoluble polyvinyl alkyl ether which has a reduced viscosity as defined herein of more than 3, said resin and said ether being present in said admixture in the proportion of up to about 1 part of polyvinyl ether to about 7 parts of phenol-aldehyde resin.

2. A resin in accordance with claim 1, wherein the molar ratio of phenol to aldehyde is about 1.1 to 1.0 and said ether has a reduced viscosity from about 3.5 to about 6.5 and is present in an amount from about 5 to about 15 percent by weight based on the weight of said fusible resin.

3. A resin in accordance with claim 1, wherein said fusible resin is a phenol-formaldehyde resin and said ether is polyvinyl ethyl ether.

4. A resin in accordance with claim 1, wherein said fusible resin is a phenol-formaldehyde resin and said ether is a polyvinyl n-butyl ether.

5. A resin in accordance with claim 2, wherein said fusible resin is a phenol-formaldehyde resin and said ether is a polyvinyl ethyl ether.

6. A resin in accordance with claim 2, wherein said fusible resin is a phenol-formaldehyde resin and said ether is a polyvinyl n-butyl ether.

7. A synthetic resin suitable for the preparation of resin-bonded abrasive articles, comprising a phenol-formaldehyde, acid-catalyzed, fusible, resin, and in intimate admixture with about 100 parts of said fusible resin, about 10 parts of water-insoluble polyvinyl ethyl ether having a reduced viscosity of about 3.5 to 4.5.

8. A synthetic resin suitable for the preparation of resin bonded abrasive articles, comprising a phenol-paraformaldehyde, acid-catalyzed, fusible resin and about 10 percent of water-insoluble polyvinyl ethyl ether having a reduced viscosity of about 3.5 to 4.5.

9. A heat-hardenable resin, comprising the synthetic resin of claim 1 and a heat-hardening agent therefor in admixture therewith.

10. A heat-hardenable resin comprising the synthetic resin of claim 2 and a heat-hardening agent therefor in admixture therewith.

11. A heat-hardenable resin comprising the synthetic resin of claim 3 and hexamethylene tetramine in heat-hardening amount admixed therewith.

12. A heat-hardenable resin comprising the synthetic resin of claim 4 and hexamethylene tetramine in heat-hardening amount admixed therewith.

13. A heat-hardenable resin comprising the synthetic resin of claim 5 and hexamethylene tetramine in heat-hardening amount admixed therewith.

14. A heat-hardenable resin comprising the synthetic resin of claim 6 and hexamethylene tetramine in heat-hardening amount admixed therewith.

15. A heat-hardenable resin, comprising about 110.8 parts of the synthetic resin of claim 7 and about 8 parts of hexamethylene tetramine admixed therewith.

16. A heat-hardenable resin, comprising about 100 parts of the synthetic resin of claim 8 and about 8 parts of hexamethylene tetramine admixed therewith.

17. An abrasive article comprising abrasive grains and, bonded therewith in heat-hardened condition, a synthetic resin as defined in claim 9.

18. An abrasive article comprising abrasive grains and, bonded therewith in heat-hardened condition, a synthetic resin as defined in claim 10.

19. An abrasive article comprising abrasive grains and, bonded therewith in heat-hardened condition, a synthetic resin as defined in claim 11.

20. An abrasive article comprising abrasive grains and, bonded therewith in heat-hardened condition, a synthetic resin as defined in claim 12.

21. An abrasive article comprising abrasive grains and, bonded therewith in heat-hardened condition, a synthetic resin as defined in claim 13.

22. An abrasive article comprising abrasive grains and, bonded therewith in heat-hardened condition, a synthetic resin as defined in claim 14.

23. An abrasive article comprising abrasive grains and, bonded therewith in heat-hardened condition, a synthetic resin as defined in claim 15.

24. An abrasive article comprising abrasive grains and, bonded therewith in heat-hardened condition, a synthetic resin as defined in claim 16.

25. A method for making a heat-hardenable synthetic resin suitable for preparing resin-bonded abrasive articles which comprises dissolving at an elevated temperature in phenol and acid catalyst a water-insoluble polyvinyl alkyl ether having a reduced viscosity of more than 3, heating the resulting solution with an amount of aldehyde such that the phenol is present in molar excess over the aldehyde, said heating being in the presence of an acid catalyst to form a brittle, fusible, homogeneous, grindable phenol-aldehyde resin containing said polyvinyl alkyl ether, and incorporating therewith an agent capable of causing said resin to become heat-hardenable to an infusible, insoluble state, said phenol, aldehyde and polyvinyl alkyl ether being used in amounts effective to provide in the synthetic resin up to about 1 part of polyvinyl ether to about 7 parts of phenol-aldehyde resin.

26. The process of claim 25, wherein the phenol-aldehyde molar ratio is 1.1 to 1.0, said ether has a reduced viscosity of about 3.5 to about 6.5 and is used in an amount from about 5 to about 15 percent by weight of the phenol-aldehyde resin, and about 10 percent by weight of hexamethylene tetramine, on the basis of weight of fusible resin, is employed.

27. A method for making a heat-hardenable synthetic resin suitable for preparing resin-bonded abrasive articles, which comprises dissolving about 2000 parts of phenol, about 200 parts of water-insoluble polyvinyl ethyl ether having a reduced viscosity of about 3.5 to 4.5, and about 25 parts of oxalic acid dihydrate at a temperature within the range of from about 102° C. to about 150° C., adding about 525 parts of paraformaldehyde to the solution at about 105° C. and maintaining these conditions until the phenol-para formaldehyde resin formation is substantially complete, dehydrating the resulting resin and incorporating about 8 parts of hexamethylene tetramine with about 100 parts of the dehydrated resin.

References Cited in the file of this patent

UNITED STATES PATENTS

| 2,111,006 | Robie | Mar. 15, 1938 |
| 2,336,792 | Langkammerer et al. | Dec. 14, 1943 |
| 2,553,816 | Ebel | May 22, 1951 |

FOREIGN PATENTS

| 722,805 | Great Britain | Feb. 2, 1955 |